United States Patent Office 3,746,726
Patented July 17, 1973

3,746,726
BROMINATING BUTYNE-(2)-DIOL-(1,4)
Franz Reicheneder, Ludwigshafen (Rhine), and Karl Dury, deceased, late of Kirchheimbolanden, by Johanna Maria Dury, heiress-at-law, Kirchheimbolanden, and Georg Krusche and Heinz Burger, Ludwigshafen (Rhine), Germany, assignors to Badische Anilin- & Soda-Fabrik Aktiengesellschaft, Ludwigshafen (Rhine), Germany
No Drawing. Continuation of application Ser. No. 528,782, Feb. 21, 1966. This application Feb. 28, 1969, Ser. No. 805,999
Claims priority, application Germany, Feb. 25, 1965, P 12 77 244.0–42
Int. Cl. C07d 5/04; C07c 31/20; C08k 6/24
U.S. Cl. 260—347.8                     2 Claims

ABSTRACT OF THE DISCLOSURE

A process for brominating butyne-(2)-diol-(1,4) in which said compound is reacted with elementary bromine in an aqueous or aqueous-mineral acid medium at a temperature of −40° C. to 150° C. The reaction can take place either in the presence of catalysts or in the absence of catalysts. The molar ratio of bromine to butyne-(2)-diol-(1,4) used in the reaction can range from 1:1 to 20:1. The process is used to produce 2,3-dibromobutene-(2) - diol - (1,4), 2,2,3,3 - tetrabromobutanediol-(1,4), mucobromic acid or 2 - hydroxy - 3,3,4,4 - tetrabromotetrahydrofuran. The invention also is directed to the novel compound 2 - hydroxy-3,3,4,4-tetrabromotetrahydrofuran.

This application is a continuation of S.N. 528,782, filed Feb. 21, 1966 which is now abandoned.

This invention relates to a method of brominating butyne-(2)-diol-(1,4) by means of elementary bromine and in particular it relates to a method in which butyne-(2)-diol-(1,4) is reacted with bromine in aqueous solution, in the presence or absence of catalysts.

It is known from Ann. Chim., 12, 3 (1948) 663 that 2,3-dibromobutene-(2)-diol-(1,4) may be prepared from butyne-(2)-diol-(1,4) by bromination in chloroform solution. Furthermore 2,2,3,3-tetrachlorobutanediol, mucochloric acid and 2,2,3,3 - tetrachlorosuccinodialdehyde may be prepared according to German patent specifications Nos. 1,125,421 and 1,156,400 and British patent specifications Nos. 875,058 and 1,010,564 by reaction of butyne-(2)-diol-(1,4) with chlorine in aqueous or aqueous mineral acid solution, in the presence or absence of catalysts.

We have found that butyne-(2)-diol-(1,4) may be reacted with elementary bromine with excellent yields when the reactants are contacted with each other in aqueous or aqueous mineral acid medium at temperatures of −40° to +150° C. in the presence or absence of catalysts.

The water or aqueous mineral acid in the new process is used in general in amounts of 100 to 500%, preferably 200 to 350%, by weight (on the butynediol). Halogen hydracids, sulfuric acid, phosphoric acid and nitric acid are particularly suitable as mineral acids; their concentration may vary within wide limits and may be up to about 50% by weight (on the reaction mixture). It is preferable to use 5 to 25% by weight aqueous mineral acid. The most favorable concentration may be easily ascertained for given conditions by experiment.

The molar ratio of bromine to butynediol used may also be varied within wide limits. It serves for guiding the reaction in the direction of the desired end product. The ratio may be from 1 to 20 moles, preferably from 1 to 8 moles of bromine per mole of butynediol.

The temperature and pressure ranges used in the new process are also wide. All temperatures from −40° C. to +150° C., preferably from 20° to 120° C., are suitable. In general pressures of 0.5 to 5, preferably of 1 to 1.2, atmospheres absolute may be used.

The bromination reaction may be accelerated by means of known halogenation catalysts, e.g. light of a wavelength of from about 250 to 700 millimicrons or free radicals or free radical forming substances, such as hydrogen peroxide or benzoyl peroxide. Alkali metal or alkaline earth metal salts, for example the chlorides, chlorates, sulfates, bromides, nitrites or nitrates of sodium, potassium, lithium, ammonium, magnesium, calcium, strontium or barium, and also heavy metal compounds, such as oxides and salts of inorganic or organic acids or enolates of iron, zinc, manganese, mercury, copper, nickel, lead, bismuth or silver are also suitable. Examples of preferred heavy metal compounds are: copper(II) chloride, copper(II) bromide, copper(II) sulfate, silver nitrate, manganese(II) sulfate, and nickel(II) sulfate. It is sufficient to add these substances in small amounts, for example of 0.1 to 10% by weight on the final weight of the reaction mixture.

The process may be carried out for example by introducing butynediol and bromine simultaneously into water or aqueous mineral acid solution contained in a suitable vessel. Addition may be made in portions or continuously. In a particularly simple embodiment of the new process, butynediol is used in the form of an aqueous solution having a content of 5 to 60%, preferably 20 to 40%, by weight of butynediol. Such a solution is easy to prepare on a commercial scale for example by reaction of aqueous formaldehyde solution with acetylene according to Reppe.

The new process has many applications and the number of compounds, some of them new, which can be prepared by the process is large. The products include, in addition to 2,2,3,3-tetrabromobutanediol-(1,4), for example 2,3-dibromobutene-(2)-diol-(1,4), 1,2,3,4-tetrabromobutene-(2), 2 - hydroxy-3,3,4,4-tetrabromotetrahydrofuran and mucobromic acid.

It is a great advantage of the new process that it is possible to guide the reaction to a very great extent in the direction of the formation of the desired end product by choice of the reaction temperautre, pressure, molar ratio and catalyst. Thus it is possible by using bromine in a molar excess at temperatures of 45° to 80° C. and by adding catalysts, to obtain almost exclusively in a very good yield the compound 2,2,3,3-tetrabromobutanediol-(1,4) which has not previously been described, and by modifying these conditions by lowering the temperature and changing, or dispensing with, the catalyst, to obtain the said compound together with 2,3-dibromobutene-(2)-diol-(1,4). The latter compound may however also be prepared by using molar or less than molar amounts of bromine at temperatures of −30° to +130° C. By working at temperatures of 90° to 110° C. using an excess of bromine, 2,2,3,3-tetrabromobutanediol-(1,4) is obtained with mucobromic acid. At temperatures of 100° to 110° C. without catalysts and with a molar excess of bromine, 1,2,3,4-tetrabromobutene-(2) may be prepared in almost quantitative yields. 2-hydroxy-3,3,4,4-tetrabromotetrahydrofuran is formed preferentially when using a molar excess of bromine in the absence of catalysts at temperatures of 80° to 100° C.

The process may readily be carried out continuously. The reactants may be added either successively or simultaneously and the operation may be cocurrent or countercurrent, for example by introducing the gaseous reactants into the liquid phase from the bottom and withdrawing the product at the top or by trickling the liquid phase down a packed column countercurrent to the ascending gas phase.

The products of bromination may be separated from the reaction mixture in a simple manner. They either separate as an oil or they crystallize out when the reaction solution is cooled, possibly following previous concentration. It is also possible to extract the reaction solution with an organic solvent; isolation by adding suitable precipitants, such as sodium sulfite or bisulfite, is also possible. When mixtures of reaction products are formed by the synthesis, these may be separated from each other by fractional crystallization, for example from water, or by dissolving out one component with a suitable solvent. Conversion into derivatives, for example into esters, and fractional distillation thereof may also be used for the separation.

The products obtained may be used as biocides, for example herbicides, fungicides, acaricides or nematocides, and as starting materials for the production of biocides, dyes or pharmaceuticals. They are also suitable as a flame resistant finish for plastics, particularly thermoplastics. This is particularly true of 2,2,3,3-tetrabromobutanediol-(1,4) and also of 2-hydroxy-3,3,4,4-tetrabromotetrahydrofuran. As compared with the prior art methods described above, the new process is cheaper since it is not necessary to use solvents. Compared with the abovementioned prior methods, the present invention represents a considerable advance in the art, for (a) it leads to compounds, such as 2,3-dibromobutenediol-(1,4)-1,2,3,4-tetrabromobutene-(2) and the new substance 2-hydroxy-3,3,4,4-tetrabromotetrahydrofuran, whose formation is not analogous to the chlorination of butyne-(2)-diol-(1,4), and (b) the formation of 2,2,3,3-tetrabromobutane-(1,4) by the new process is surprising for it proceeds in a particularly simple manner in spite of the fact that the bromine atom is considerably larger than the chlorine atom.

The invention is illustrated by the following examples in which parts and percentages are by weight unless otherwise stated. Parts by volume bear the same relation to parts by weight as the liter to the kilogram.

EXAMPLE 1

300 parts of 50% aqueous butynediol solution and 495 parts of bromine are allowed to flow simultaneously during a period of three hours into a solution of 100 parts of copper(I) chloride in 1000 parts of concentrated hydrochloric acid in a stirred flask having a capacity of 2 parts by volume, a temperature of 48° to 53° C. being maintained. Crystals separate upon cooling. These are suction filtered, washed with water and dried at 60° C. in vacuo. The melting point of 250° to 260° C. (with decomposition) becomes 259° to 261° C. (with decomposition) following recrystallization from tetrahydrofuran or acetonitrile. The yield of tetrabromobutanediol is 95% of the theory.

Analytical values of $C_4H_6O_2Br_4$.—Found (percent): C, 11.8; H, 1.0; O, 9.0; Br, 78.6. Calculated (percent): C, 11.8; H, 1.47; O, 7.9; Br, 78.8.

EXAMPLE 2

400 parts of 30% aqueous butynediol solution is allowed to flow into a solution of 88 parts of copper sulfate pentahydrate in 500 parts of 10% sulfuric acid in a stirred flask having a capacity of 2 parts by volume and at the same time 650 parts of bromine is forced into the reaction mixture by a slight excess pressure with nitrogen. The temperature is kept at 90° to 98° C. The product is then allowed to cool. The crystals which have separated are obtained after conventional working up in an amount of 180 parts. They melt with decomposition at 250° to 255° C. After the mother liquor has stood for some time, 280 parts of a crystalline product is obtained which after having been washed with water has a melting point of 119° to 120° C. By comparison by means of infrared spectrum, mixed melting point and thin film chromatogram, the high melting point product is found to be tetrabromobutanediol and the low melting point product to be mucobromic acid.

EXAMPLE 3

170 parts of bromine and 700 parts of 50% aqueous butynediol solution are allowed to flow simultaneously during the course of four hours into 1000 parts of 10% sulfuric acid in a stirred flask having a capacity of 2 parts by volume, a temperature of 25° to 30° C. being maintained by cooling with ice-water. The crystals which separate out are suction filtered, washed with water and dried at 40° C. in vacuo. 388 parts of crystals is obtained. A thin film chromatogram shows that they constitute a mixture of about 60% of dibromobutenediol and 40% of tetrabromobutanediol. The mixture may be separated into its components by fractional crystallization from water.

EXAMPLE 4

60 parts of nickel chloride hexahydrate is dissolved in 1000 parts of 10% hydrochloric acid in a stirred flask having a capacity of 2 parts by volume. 800 parts of 50% aqueous butynediol solution and 1500 parts of bromine are then allowed to flow in simultaneously during the course of four hours while stirring, a temperature of 25° to 35° C. being maintained by cooling with ice-water. The deposited crystals are suction filtered and washed with water. 1190 parts of a white mixture of dibromobutenediol and tetrabromobutanediol in the ratio 9:1 is obtained which may separated into its components by means of fractional crystallization from water. The melting point of the dibromobutenediol is 110° to 112° C. and that of tetrabromobutanediol is 257° to 262° C. (with decomposition).

EXAMPLE 5

210 parts of copper sulfate pentahydrate is dissolved in 1200 parts of 10% sulfuric acid in a stirred flask having a capacity of 2 parts by volume. Then 300 parts of 30% aqueous butynediol solution and 297 parts of bromine are allowed to flow in simultaneously during the course of three hours, a temperature of 29° to 32° C. being maintained by cooling with ice-water. After allowing the whole to stand overnight, the deposited crystals are suction filtered, washed with water and dried at about 40° C. in vacuo. 122 parts of white dibromobutenediol is obtained with a melting point of 111° C.

Analytical values.—Found (percent): C, 20.2; H, 2.5; O, 12.5; Br, 65.0. Calculated (percent): C, 19.5; H, 2.43; O, 13.0; Br, 65.0.

EXAMPLE 6

120 parts of manganese sulfate monohydrate is dissolved in 1000 parts of 10% sulfuric acid in a stirred flask having a capacity of 2 parts by volume. 500 parts of 50% aqueous butyne-diol solution and 550 parts of bromine are then allowed to flow in simultaneously while stirring during the course of three hours, a temperature of 25° to 30° C. being maintained by cooling with ice-water. The deposited crystals are suction filtered, washed with water and dried at 40° C. in vacuo. 650 parts of dibromobutenediol having a melting point of 112° to 114° C. is obtained. It is proved to be very pure both in a thin film chromatogram and in an infrared spectroscope. The yield is 94.5% of the theory.

EXAMPLE 7

400 parts of 50% aqueous butynediol solution and 390 parts of brominne are allowed to flow simultaneously while stirring into 1000 parts of water in a stirred flask having a capacity of 2 parts by volume during the course of two hours while stirring, a temperature of 25° to 30° C. being maintained by cooling with ice-water. The deposited crystals are suction filtered, washed with water and dried at 40° C. in vacuo. 450 parts (82% of the theory) of dibromobutenediol is obtained having a melting point of 110° to 112° C.

EXAMPLE 8

60 parts of bromine is allowed to flow at a temperature of 80° to 85° C. into a suspension of 50 parts of aluminum oxide according to Brockman in 50 parts of 50% aqueous butynediol solution. After the whole has cooled, 50 parts of a white product separates out which after conventional working up has a melting point of 115° to 116° C. It is proved by mixed melting point, infrared spectrum and thin film chromatogram to be pure dibromobutenediol.

EXAMPLE 9

400 parts of 50% aqueous butynediol solution and 820 parts of bromine are allowed to flow into 1000 parts of 10% sulfuric acid in a stirred flask having a capacity of 2 parts by volume, the temperature being kept at from 95° to 100° C. An oil separates from the solution and partly crystallizes upon cooling. The mixture is stirred with 100 parts of 40% sodium bisulfite solution and in the course of a few minutes a white gelatinous product separates which is suction filtered, stirred with methylene chloride, boiled up with 10% sulfuric acid, cooled, and shaken up with ethyl acetate. The ethyl acetate solution is concentrated. Colorless crystals of 2-hydroxy-3,3,4,4-tetrabromotetrahydrofuran are obtained which melt at 200° C. with decomposition after they have been recrystallized from ether.

Analytical values for $C_4H_4O_2Br_4$.—Found (percent): C, 12.4; H, 1.1; O, 8.0; Br, 79.1. Calculated (percent): C, 11.9; H, 0.99; O, 7.95, Br, 78.3.

The mother liquor obtained after the oil has been separated is heated to a temperature of 110° to 120° C. and 1600 parts of bromine and 500 parts of 50% aqueous butynediol solution are allowed to flow in during the course of three hours. An oil again separates from the solution. When the oil has been separated, it solidifies to a crystal mash which is suction filtered and washed with ice-cold methanol. 880 parts (81% of the theory) of 2,2,3,3-tetrabromobutene-(2) is obtained as a white finely crystalline product having a melting point of 66° to 68° C. When the product has been recrystallized from ethanol, it has the following analytical values for $C_4H_4Br_4$:

Found (percent): C, 12.6; H, 1.0; Br, 86.5. Calculated (percent): C, 12.9; H, 1.07; Br, 86.0.

Experiments 1–4

30 parts of a styrene polymer is mixed with one of the halogen compounds specified below (Tests 1–3), or used alone (Test 4), and dissolved in 100 parts of methylene chloride. The solutions are poured on to glass plates and the methylene chloride is allowed to evaporate at ambient temperature. The resultant sheet, which is approximately 0.5 to 2 mm. in thickness, is free from residual methylene chloride by keeping it in a vacuum at 35° C. for twelve hours.

In order to test its combustibility each sheet is kept for five seconds in a luminous gas flame having a height of 40 mm. The flame is then removed. The mean period for which a sheet continues to burn after the flame has been removed is a measure of the efficiency of the halogen compound added as a flame retardant. The mean value is obtained by eliminating the upper and lower maxima from the values determined in 12 individual tests and computing the arithmetical mean from the remaining 10 values.

| Test No. | Additive | Mean period |
|---|---|---|
| 1 | 0.75 part tetrachlorobutanediol | Burns away completely. |
| 2 | 1.5 part tetrachlorobutanediol | Do. |
| 3 | 0.75 part tetrabromobutanediol | 1.5 seconds. |
| 4 | None | Burns away completely. |

The results of Tests 1, 2 and 4 are practically identical.

We claim:
1. 2-hydroxy-3,3,4,4-tetrabromotetrahydrofuran.
2. A process for producing 2,2,3,3-tetrabromobutanediol-(1,4) which comprises: reacting butyne-(2)-diol-(1,4) with a molar excess of bromine at a temperature of from 45° to 80° C. in the presence of a halogenation catalyst, said reaction taking place in an aqueous or aqueous-mineral acid medium.

References Cited

UNITED STATES PATENTS 3,054,739   9/1962   Reicheneder et al. __ 260—347.8
3,334,032   8/1967   Kardos _____ 204—49

OTHER REFERENCES

House, Herbert: Modern Synthetic Reactions, W. A. Benjamin, Inc., N.Y., p. 138 (Jan. 28, 1965.)

ALEX MAZEL, Primary Examiner

B. I. DENTZ, Assistant Examiner

U.S. Cl. X.R.

204—158, 163; 252—8.1; 260—45.8, 45.95, 531, 633, 654, 999